Figure 1:
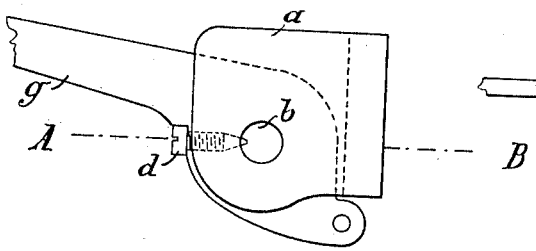

H. ENDEMANN.
TYPE BAR PIVOT.
APPLICATION FILED APR. 2, 1912.

1,040,658.

Patented Oct. 8, 1912.

Witnesses:
P. Philipp
A. Fornandes

Inventor:
Hubert Endemann,
by John C. Seifert
Attorney

UNITED STATES PATENT OFFICE.

HUBERT ENDEMANN, OF VIENNA, AUSTRIA-HUNGARY.

TYPE-BAR PIVOT.

1,040,658.   Specification of Letters Patent.   Patented Oct. 8, 1912.

Application filed April 2, 1912. Serial No. 687,990.

*To all whom it may concern:*

Be it known that I, HUBERT ENDEMANN, a subject of the Emperor of Austria-Hungary, residing at Vienna, in the Province of Lower Austria and Empire of Austria-Hungary, have invented a new and useful Improvement in Type-Bar Pivots, of which the following is a specification.

The invention has for its purpose so to pivot the type-bars to their brackets as to admit of their ready removal and insertion and of their being accurately adjusted to compensate for wearing of the moving parts.

In order to attain the purpose in view, a recess is formed in either cheek of a forked bracket and into this recess is loosely inserted a body which turns toward a conical pivot hole of the bar a tapering portion of circular cross section. Suitable shapes of this loosely inserted body are a ball, a double cone, or a prism or cylinder provided with a conical or spherical end. By means of a pointed screw, or a wedge, or other organ adapted to produce slow and progressive displacement, the body inserted in the recess can be so wedged against the conical pivot hole of the bar, that one side of the ball or the conical or spherical point of the otherwise shaped body enters the conical pivot hole, and that thereby the lever is exactly and without clearance pivoted between the said ball or conical point, on the one hand, and the other cheek of the forked bracket, on the other hand. It is obvious that this construction affords possibility for easily adjusting the type-bars at any given moment and thus keeping the lines straight.

Figure 2:
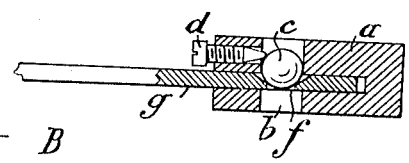
Figure 3:
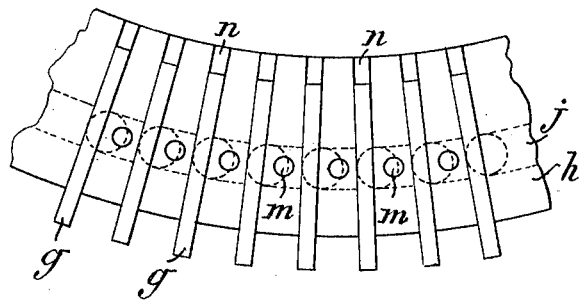
Figure 4:
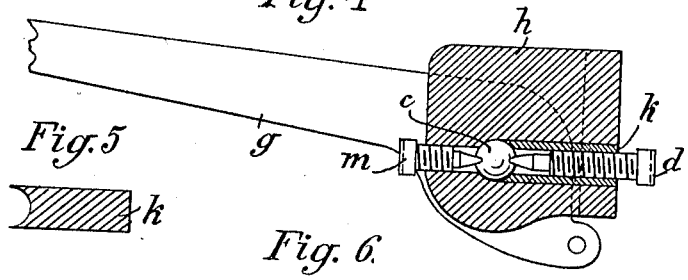
Figure 5:
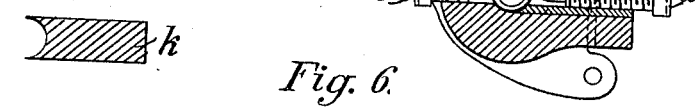
Figure 6:
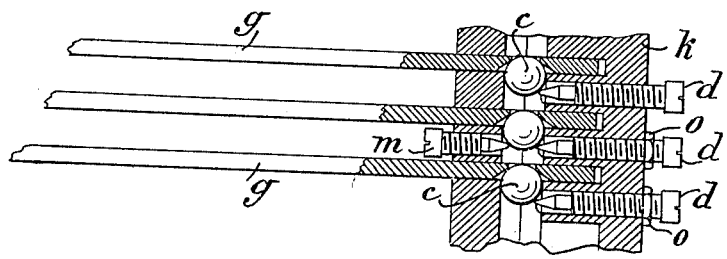

In the drawings, two ways of carrying the invention into practice are shown as follows:

Figure 1 is a side elevation of a forked bracket with a type-bar hinged therein; Fig. 2 shows a section on the line A—B of Fig. 1; Fig. 3 shows a plan view of a portion of the bracket ring segment and the type-bars hinged thereto; Fig. 4 is a cross section of the said bracket ring segment, the type-bar and the parts of the improved hinge-joint being shown in elevation; Fig. 5 shows a detail; Fig. 6 represents a horizontal section of a portion of the bracket ring segment and the type-bars.

Referring to Figs. 1 and 2, $a$ is a forked bracket or support, in which a recess $b$ is bored to receive a ball $c$. For the purpose of simplifying the manufacture of the forked bracket, the recess $b$ is bored through both cheeks, and thereby an oil chamber is provided at the same time, and permanent good oiling of the hinge-joint secured. A pointed screw $d$ of very small pitch is eccentrically directed toward the ball $c$, wherefore screwing home of the screw has for its effect that the ball $c$ is pressed into the conical pivot hole $f$ of the type-bar $g$, which is in turn wedged against the other cheek of the fork. The portion of the ball $c$ entering the pivot hole $f$ of the type-bar $g$ does the office of a pivot for the latter.

In Fig. 3 the bracket ring segment $h$ has cut into it radial grooves $n$, which replace the forked brackets and receive the type-bars $g$. Into the lower surface of the said ring segment $h$ is cut a concentric groove $j$, the bottom of which is semicircular in cross-section. Into this groove $j$ is inserted a bar $k$ the cross-section of which is shown by Fig. 5, and which forms, together with the bottom of groove $j$, a passage of circular cross-section into which the balls $c$ are inserted. The set-screws $d$ and $m$ are so arranged upon the bracket ring segment $h$ that each screw is placed between two type-bars $g$. As the screws are directed eccentrically toward the balls $c$, their screwing home has for its effect that the balls are pushed toward the type-bars $g$, partly enter the conical pivot holes of these latter, and press or force them against the adjacent side of the groove $n$. As the pitch of the screws is very small, they admit of very accurate adjustment and of doing away with any clearance between the type-bars and the parts between which they turn. While turning, each type-bar turns around one side of the respective ball. In cases when the conical pivot holes $f$ of the type-bars $g$ or the balls $c$ are worn in consequence of long use, it suffices somewhat to tighten the screw $d$ for restoring the working without clearance and consequently the straightness of the written lines. The screws *d* may be secured in their position by lock-nuts *o*. So long as a ball *c* is accurately guided in the recess *b*, one screw *d* will suffice to adjust the ball toward the type-bar *g*. But should the recess *b* become worn owing to long use and a clearance result between the ball and the sides of the recess, a second screw *m* (Figs. 4 and 6), acting in the opposite direction, will be found useful as an adjustable abutment for the ball.

What I do claim as my invention, and desire to secure by Letters-Patent, is—

1. In a type-bar pivot, the combination of a segment having a recess formed in each side thereof; a type-bar to engage in the segment and having a conical recess in the face thereof opposite the segment recess; a body loosely engaging in said segment recess and having a circular projection to engage in the conical recess in the type-bar; and adjustable means to wedge said body toward the type bar, substantially as and for the purpose specified.

2. In a type-bar pivot, the combination of a segment having a recess formed in each side thereof; a type-bar to engage in the segment and having a conical pivot hole in the face thereof opposite the segment recess; a ball loosely engaging in the segment recess; and adjustable means to wedge the ball toward the type-bar, substantially as and for the purpose specified.

3. In a type-bar pivot, the combination of a segment having a recess formed in one side thereof; a type bar to engage in said segment having a conical recess in the face thereof opposite the recess in the segment; a body loosely engaging in the segment recess and having a semi-spherical portion to engage in the recess in the type-bar; and a screw having a conical point, said screw being movable parallel to the type-bar, and the conical point being in contact with the outer end of the body engaging in the recess, substantially as and for the purpose specified.

4. In a type-bar pivot, the combination of a segment having a recess formed in each side thereof; a type-bar to engage in said segment having a conical pivot hole in the face thereof opposite the segment recess; a ball loosely engaging in the segment recess; and a screw in the segment having a conical point, said screw being movable parallel to the plane of the bar, and the conical point of the screw being in contact with the outer half of the ball, substantially as and for the purpose specified.

5. In a typewriting machine, the combination of a support having a slot and a bore transversely to the slot and extending through one side wall of the slot; a type bar to engage in the slot in the support, said type-bar having a conical recess in one face thereof; and means to engage in the bore in the support and in the type-bar recess to releasably maintain the type-bar in the support.

6. In a typewriting machine, the combination of a support having a slot and a bore transversely to the slot; a type-bar to engage in the slot in the support; a member having a spherical surface engaging in the bore in the support with the spherical surface in engagement with the type-bar; and means to engage with said member in the bore to maintain it in engagement with the type bar and the latter in the support, substantially as and for the purpose specified.

7. In a typewriting machine, the combination of a support having a slot and a bore transversely of the slot; a type-bar having a conical recess in one side to engage in the slot in the support; a ball to engage in the bore in the support and in the type-bar recess; and adjustable means to engage in the bore in the support and with the ball to maintain it in the type-bar recess, substantially as and for the purpose specified.

8. In a typewriting machine, the combination of a support having a slot and a bore transversely of the slot; a type-bar having a conical recess in one side thereof and engaging in the slot in the support; a ball engaging in the bore in the support and in the type-bar recess; and a set screw threaded into the support with its end projecting into the bore in the support to engage with and maintain the ball in the bore and in the type-bar recess, substantially as and for the purpose specified.

9. In a typewriting machine, the combination of a support having a slot and a bore transversely to the slot; a type-bar having a conical recess in one side thereof to engage in the slot in the support, a ball to engage in the bore in the support and the type-bar recess; and a set screw threaded into the support in a plane parallel with the plane of the type bar, said set screw having a conical end projecting into the bore in the support and engaging with the ball to maintain the latter in the bore in the support and in the type-bar recess, substantially as and for the purpose specified.

10. In a typewriting machine, the combination of a segment having a plurality of radial slots and a concentric groove in the bottom cutting through said slots; type-bars to engage in said slots, each type-bar having a conical recess in one side thereof; a bar to engage in the concentric groove and in conjunction with the bottom of the groove constituting a bore circular in cross section; balls engaging in said bore, said balls interposed with the type-bars and each adapted to engage in the conical recess of one of the bars; and set screws threaded into the bore, said screws having a conical end to engage with the balls to maintain them in
5 engagement in the conical type-bar recess, substantially as and for the purpose specified.

In witness whereof I have signed this specification in presence of two witnesses.

HUBERT ENDEMANN.

Witnesses:
    VICTOR KERPL,
    AUGUST FUGGER.

Copies of this patent may be obtained for five cents each, by addressing the "Commissioner of Patents, Washington, D. C."